(12) United States Patent
Smith et al.

(10) Patent No.: US 10,535,181 B2
(45) Date of Patent: *Jan. 14, 2020

(54) VIRTUAL VIEWPOINT FOR A PARTICIPANT IN AN ONLINE COMMUNICATION

(71) Applicant: Microsoft Technology Licensing, LLC, Redmond, WA (US)

(72) Inventors: Yancey Christopher Smith, Kirkland, WA (US); Eric G. Lang, Yarrow Point, WA (US); Zhengyou Zhang, Bellevue, WA (US); Christian F. Huitema, Clyde Hill, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/389,986

(22) Filed: Apr. 21, 2019

(65) Prior Publication Data

US 2019/0244413 A1 Aug. 8, 2019

Related U.S. Application Data

(63) Continuation of application No. 15/831,025, filed on Dec. 4, 2017, now Pat. No. 10,325,400, which is a
(Continued)

(51) Int. Cl.
*G06T 15/04* (2011.01)
*H04N 7/15* (2006.01)
(Continued)

(52) U.S. Cl.
CPC .............. *G06T 15/04* (2013.01); *G06T 15/08* (2013.01); *G06T 15/205* (2013.01); *G06T 17/00* (2013.01);
(Continued)

(58) Field of Classification Search
CPC combination set(s) only.
See application file for complete search history.

(56) References Cited

U.S. PATENT DOCUMENTS

| 9,946,076 B2* | 4/2018 | Smits ...................... G03B 35/18 |
| 2003/0034988 A1* | 2/2003 | Raskar .................. G06T 15/503 345/629 |
| 2008/0298571 A1* | 12/2008 | Kurtz ...................... H04N 7/142 379/156 |

FOREIGN PATENT DOCUMENTS

KR 20100126812 A 12/2010

OTHER PUBLICATIONS

"Office Action Issued in Korean Patent Application No. 10-2015-7009265", dated Jun. 21, 2019,14 Pages.
(Continued)

*Primary Examiner* — Phung-Hoang J Nguyen
(74) *Attorney, Agent, or Firm* — Schwegman Lundberg & Woessner, P.A.

(57) ABSTRACT

The systems and methods generate geometric proxies for participants in an online communication session, where each geometric proxy is a geometric representation of a participant and each geometric proxy is generated from acquired depth information and is associated with a particular virtual box. The systems and methods also include generating a scene geometry that visually simulates an in-person meeting of the participants where the scene geometry includes the geometric proxies, and the virtual boxes of the geometric proxies are aligned within the scene geometry based on a number of the participants and a reference object to which the virtual boxes are aligned. In addition, the systems and methods cause a display of the scene geometry with the geometric proxies, where the display of a particular geo-
(Continued)

metric proxy includes a video of the participant corresponding to the particular geometric painted onto the particular geometric proxy.

20 Claims, 8 Drawing Sheets

Related U.S. Application Data continuation of application No. 15/098,091, filed on Apr. 13, 2016, now Pat. No. 9,836,870, which is a continuation of application No. 14/873,190, filed on Oct. 1, 2015, now Pat. No. 9,332,218, which is a continuation of application No. 13/602,097, filed on Aug. 31, 2012, now abandoned.

(60) Provisional application No. 61/653,983, filed on May 31, 2012.

(51) Int. Cl.
*G06T 15/08* (2011.01)
*G06T 15/20* (2011.01)
*G06T 17/00* (2006.01)
*H04N 7/14* (2006.01)
*H04N 13/117* (2018.01)
*H04N 13/257* (2018.01)
*H04N 13/239* (2018.01)

(52) U.S. Cl.
CPC ............... *H04N 7/142* (2013.01); *H04N 7/15* (2013.01); *H04N 7/157* (2013.01); *H04N 13/117* (2018.05); *H04N 13/239* (2018.05); *H04N 13/257* (2018.05); *G06T 2210/56* (2013.01); *H04R 2227/005* (2013.01)

(56) References Cited

OTHER PUBLICATIONS

"Summons to Attend Oral Proceedings Issued in European Patent Application No. 13780272.4", Mailed Date: Jul. 17, 2019, 7 Pages.
U.S. Appl. No. 13/602,097, filed Aug. 31, 2012, Perspective-Correct Communication Window With Motion Parallax.
U.S. Appl. No. 14/873,190 U.S. Pat. No. 9,332,218, filed Oct. 1, 2015, Perspective-Correct Communication Window With Motion Parallax.
U.S. Appl. No. 15/098,091 U.S. Pat. No. 9,836,870, filed Apr. 13, 2016, Geometric Proxy for a Participant in an Online Meeting.
U.S. Appl. No. 15/831,025 U.S. Pat. No. 10,325,400, filed Dec. 4, 2017, Virtual Viewpoint for a Participant in an Online Communication.

* cited by examiner

VIRTUAL VIEWPOINT FOR A PARTICIPANT IN AN ONLINE COMMUNICATION

CROSS REFERENCE TO RELATED APPLICATIONS

This application is a continuation of U.S. patent application Ser. No. 15/831,025, titled "Virtual Viewpoint for a Participant in an Online Communication" and filed Dec. 4, 2017, which is a continuation of U.S. Pat. No. 9,836,870, filed Apr. 13, 2016, and titled "Geometric Proxy for a Participant in an Online Meeting", which is a continuation of U.S. Pat. No. 9,332,218, filed Oct. 1, 2015 and titled "PERSPECTIVE-CORRECT COMMUNICATION WINDOW WITH MOTION PARALLAX," which is a continuation of U.S. patent application Ser. No. 13/602,097, filed Aug. 31, 2012 and titled "PERSPECTIVE-CORRECT COMMUNICATION WINDOW WITH MOTION PARALLAX", which claims priority to U.S. Pat. App. No. 61/653,983, filed May 31, 2012, the disclosures of which are all incorporated in their entirety by reference herein.

BACKGROUND

Current video conferencing technology typically uses a single camera to capture RGB data (from the red, blue, and green (RGB) color model) of a local scene. This local scene typically includes the people that are participating in the video conference, or meeting participants. The data then is transmitted in real time to a remote location and then displayed to another meeting participant that is in a different location than the other meeting participant.

While advances have been made in video conferencing technology that help provide a higher definition capture, compression, and transmission, typically the experience falls short of recreating the face-to-face experience of an in-person conference. One reason for this is that the typical video conferencing experience lacks eye gaze and other correct conversational geometry. For example, typically the person being captured remotely is not looking into your eyes, as one would experience in a face-to-face conversation. This is because their eyes are not looking where the camera is located and instead are looking at the screen. Moreover, three-dimensional (3D) elements like motion parallax and image depth, as well as the freedom to change perspective in the scene are lacking because there is only a single, fixed video camera capturing the scene and the meeting participants.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Implementations provide an in-person communication experience by generating a changable virtual viewpoint for a participant in an online communication. For instance, techniques described herein capture visual data about participants in an online communication, and create a realistic geometric proxy from the visual data. A virtual scene geometry is generated that mimics an arrangement of an in-person meeting for the online communication. According to various implementations, a virtual viewpoint displays a changing virtual viewpoint, such as based on a change in position of a participants face.

Embodiments of the system and method generally include three components. A first component, the capture and creation component, is used to capture visual data about each participant and create a realistic geometric proxy from the data. This geometric proxy is a geometric representation of the participant that has real video painted onto the geometric representation frame by frame in order to increase the realism. Moreover, a geometric proxy is created for each participant in the meeting. The data is captured using one or more camera pods. In some embodiments these camera pods include a stereoscopic infrared (IR) camera and an IR emitter (to capture depth information) and a RGB camera (to capture RGB data). The camera pod layout at each endpoint is variable and dependent on the number of camera pods available at the endpoint. Each geometric proxy is created using the RGD data and the depth information.

A second component is a scene geometry component, which is used to create a virtual scene geometry that imitates the arrangement of an in-person meeting. The scene geometry is dependent on the number of participants in the meeting. Creating the scene geometry includes both the registration of the three-dimensional (3D) volume and the alignment of the 3D space that the camera pods capture. The general idea of the scene geometry component is to create relative geometry between the meeting participants. The scene is aligned virtually to mimic a real-life scene as if the participants are in the same physical location and engaged in an in-person conversation.

The scene geometry uses virtual boxes to have relative, consistent geometry between the participants. A meeting with two participants (or a one-to-one (1:1) scene geometry) consists of two boxes that occupy the spaces in front of the respective monitors (not shown) of the two participants. When there are three participants the scene geometry includes three virtual boxes that are placed around a virtual round table in an equidistant manner.

The scene geometry also includes a virtual camera. The virtual camera is a composition of images from two or more of the camera pods in order to obtain a camera view that is not captured by any one camera pod alone. This allows embodiments of the system and method to obtain a natural eye gaze and connection between people. Face tracking (or more specifically, eye tracking), is used to improve performance by helping the virtual camera remain level with the eye gaze of the viewer. In other words the face tracking provides a correct virtual camera view that is aligned with the viewer's eyes. This means that the virtual camera interacts with the face tracking to create a virtual viewpoint that has the user looking straight at the other participant.

Each geometric proxy is rendered relative to each other in the scene geometry. The rendered geometric proxies and scene geometry is then transmitted to each of the participants. The third component is the virtual viewpoint component, which displays a changing virtual viewpoint to the viewer based on the position and orientation of the viewer's face. This motion parallax effect adds realism to the scene displayed on the monitor. In addition, face tracking can be used to track the position and orientation of the viewer's face. What the viewer sees on the monitor in one facial position and orientation is different from what the viewer sees in another facial position and orientation.

Embodiments of the system and method also include facilitating multiple participants at a single endpoint. An endpoint means a location or environment containing one or more participants of the conference or meeting. In some embodiments a face tracking technique tracks two different faces and then provides different views to different viewers. In other embodiments glasses are worn by each of the multiple participants at the endpoint and in some embodiments the glasses have active shutters on them that show each wearer alternating frames displayed by the monitor that are tuned to each pair of glasses. Other embodiments use a monitor having multiple viewing angles such that a viewer looking at the monitor from the right side sees one scene and another viewer looking at the monitor from the left sees a different scene.

Accordingly, a system is disclosed that, in one embodiment, includes one or more processors, and one or more computer-readable storage devices having computer-executable instructions stored thereon that, when executed by the one or more processors, configure the system to perform operations comprising generating a plurality of geometric proxies for a plurality of participants in a communication session, wherein each geometric proxy selected from the geometric proxies comprises a geometric representation of a participant selected from the plurality of participants, and each of the geometric proxies is generated from acquired depth information and is associated with a particular virtual box. The operations also include generating a scene geometry that visually simulates an in-person meeting of the plurality of participants, wherein the scene geometry includes the plurality of geometric proxies, and the virtual boxes of the geometric proxies are aligned within the scene geometry based on a number of the participants and a reference object to which the virtual boxes are aligned. The operations further include causing a display of the scene geometry with the plurality of geometric proxies, wherein the display of a particular geometric proxy comprises a video of the participant corresponding to the particular geometric painted onto the particular geometric proxy.

In another embodiment of the system, the operations further comprise acquiring depth information for the plurality of participants, wherein the depth information for a participant selected from the from plurality of participants is based on a distance between the selected participant and a camera, generating a plurality of sparse point clouds from the acquired depth information, wherein a sparse point cloud selected from the plurality of sparse point clouds has a first number of points, and each sparse point cloud corresponds to a participant in the online communication. The operations also include generating a plurality of dense point clouds based on the sparse point clouds, wherein a dense point cloud selected from the plurality of dense point clouds has a second number of points greater than the first number of points, wherein each geometric proxy is generated from a corresponding dense point cloud selected from the plurality of dense point clouds.

In a further embodiment of the system, causing a display of the scene geometry comprises causing a display of a virtual viewpoint that includes the plurality of geometric proxies, wherein a change in a detected position of a selected participant causes a change in the virtual viewpoint of a geometric proxy selected from the plurality of geometric proxies.

In yet another embodiment of the system, the operations further comprise adding a motion parallax to the virtual viewpoint using head tracking of a participant selected from the plurality of participants, wherein the motion parallax is dependent on an eye gaze of the selected participant.

In yet a further embodiment of the system, the virtual boxes are aligned to be virtually equidistant from the reference object.

In another embodiment of the system, the operations further comprise generating a first virtual eye gaze box around eyes of a first participant selected from the plurality of participants, generating a second virtual eye gaze box around eyes of a second participant selected from the plurality of participants, and aligning the first virtual eye gaze box and the second virtual eye gaze box such that first virtual eye gaze box is level with the second virtual eye gaze box.

In a further embodiment of the system, the system further comprises a lenticular monitor that allows for multiple viewing angles, and the operations further comprise causing a display of the scene geometry by the lenticular display, wherein a right field-of-view of the scene geometry is displayed on a right side of the lenticular display, and a left field-of-view of the scene geometry is displayed on a left side of the lenticular display.

This disclosure further describes a method that includes generating a plurality of geometric proxies for a plurality of participants in a communication session, wherein each geometric proxy selected from the geometric proxies comprises a geometric representation of a participant selected from the plurality of participants and each of the geometric proxies is generated from acquired depth information and is associated with a particular virtual box. The method also includes generating a scene geometry that visually simulates an in-person meeting of the plurality of participants, wherein the scene geometry includes the plurality of geometric proxies, and the virtual boxes of the geometric proxies are aligned within the scene geometry based on a number of the participants and a reference object to which the virtual boxes are aligned. The method additionally includes causing a display of the scene geometry with the plurality of geometric proxies, wherein the display of a particular geometric proxy comprises a video of the participant corresponding to the particular geometric painted onto the particular geometric proxy.

In another embodiment of the method, the method includes acquiring depth information for the plurality of participants, wherein the depth information for a participant selected from the from plurality of participants is based on a distance between the selected participant and a camera and generating a plurality of sparse point clouds from the acquired depth information, wherein a sparse point cloud selected from the plurality of sparse point clouds has a first number of points, and each sparse point cloud corresponds to a participant in the online communication. The method also includes generating a plurality of dense point clouds based on the sparse point clouds, wherein a dense point cloud selected from the plurality of dense point clouds has a second number of points greater than the first number of points, and each geometric proxy is generated from a corresponding dense point cloud selected from the plurality of dense point clouds.

In a further embodiment of the method, causing a display of the scene geometry comprises causing a display of a virtual viewpoint that includes the plurality of geometric proxies, wherein a change in a detected position of a selected participant causes a change in the virtual viewpoint of a geometric proxy selected from the plurality of geometric proxies.

In yet another embodiment of the method, the method includes adding a motion parallax to the virtual viewpoint using head tracking of a participant selected from the plurality of participants, wherein the motion parallax is dependent on an eye gaze of the selected participant.

In yet a further embodiment of the method, the virtual boxes are aligned to be virtually equidistant from the reference object.

In another embodiment of the method, the method includes generating a first virtual eye gaze box around eyes of a first participant selected from the plurality of participants, generating a second virtual eye gaze box around eyes of a second participant selected from the plurality of participants, and aligning the first virtual eye gaze box and the second virtual eye gaze box such that first virtual eye gaze box is level with the second virtual eye gaze box.

In a further embodiment of the method, the method includes causing a display of the scene geometry by a lenticular display that allows for multiple viewing angles, wherein a right field-of-view of the scene geometry is displayed on a right side of the lenticular display, and a left field-of-view of the scene geometry is displayed on a left side of the lenticular display.

This disclosure also provides for a system that includes means for generating a plurality of geometric proxies for a plurality of participants in a communication session, wherein each geometric proxy selected from the geometric proxies comprises a geometric representation of a participant selected from the plurality of participants, and each of the geometric proxies is generated from acquired depth information and is associated with a particular virtual box. Additionally, the system includes means for generating a scene geometry that visually simulates an in-person meeting of the plurality of participants, wherein the scene geometry includes the plurality of geometric proxies, and the virtual boxes of the geometric proxies are aligned within the scene geometry based on a number of the participants and a reference object to which the virtual boxes are aligned. The system also includes means for causing a display of the scene geometry with the plurality of geometric proxies, wherein the display of a particular geometric proxy comprises a video of the participant corresponding to the particular geometric painted onto the particular geometric proxy.

In another embodiment of the system, the system includes means for acquiring depth information for the plurality of participants, wherein the depth information for a participant selected from the from plurality of participants is based on a distance between the selected participant and a camera and means for generating a plurality of sparse point clouds from the acquired depth information, wherein a sparse point cloud selected from the plurality of sparse point clouds has a first number of points, and each sparse point cloud corresponds to a participant in the online communication. The system also includes means for generating a plurality of dense point clouds based on the sparse point clouds, wherein a dense point cloud selected from the plurality of dense point clouds has a second number of points greater than the first number of points, and each geometric proxy is generated from a corresponding dense point cloud selected from the plurality of dense point clouds.

In a further embodiment of the system, the means for causing a display of the scene geometry comprises means for causing a display of a virtual viewpoint that includes the plurality of geometric proxies, wherein a change in a detected position of a selected participant causes a change in the virtual viewpoint of a geometric proxy selected from the plurality of geometric proxies.

In yet another embodiment of the system, the system includes means for adding a motion parallax to the virtual viewpoint using head tracking of a participant selected from the plurality of participants, wherein the motion parallax is dependent on an eye gaze of the selected participant.

In yet a further embodiment of the system, the virtual boxes are aligned to be virtually equidistant from the reference object.

In another embodiment of the system, the system includes means for generating a first virtual eye gaze box around eyes of a first participant selected from the plurality of participants, means for generating a second virtual eye gaze box around eyes of a second participant selected from the plurality of participants, and means for aligning the first virtual eye gaze box and the second virtual eye gaze box such that first virtual eye gaze box is level with the second virtual eye gaze box.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of perspective-correct communication window system and method reference is made to the accompanying drawings, which form a part thereof, and in which is shown by way of illustration a specific example whereby embodiments of the perspective-correct communication window system and method may be practiced. It is to be understood that other embodiments may be utilized and structural changes may be made without departing from the scope of the claimed subject matter.

I. System Overview

Figure 1:
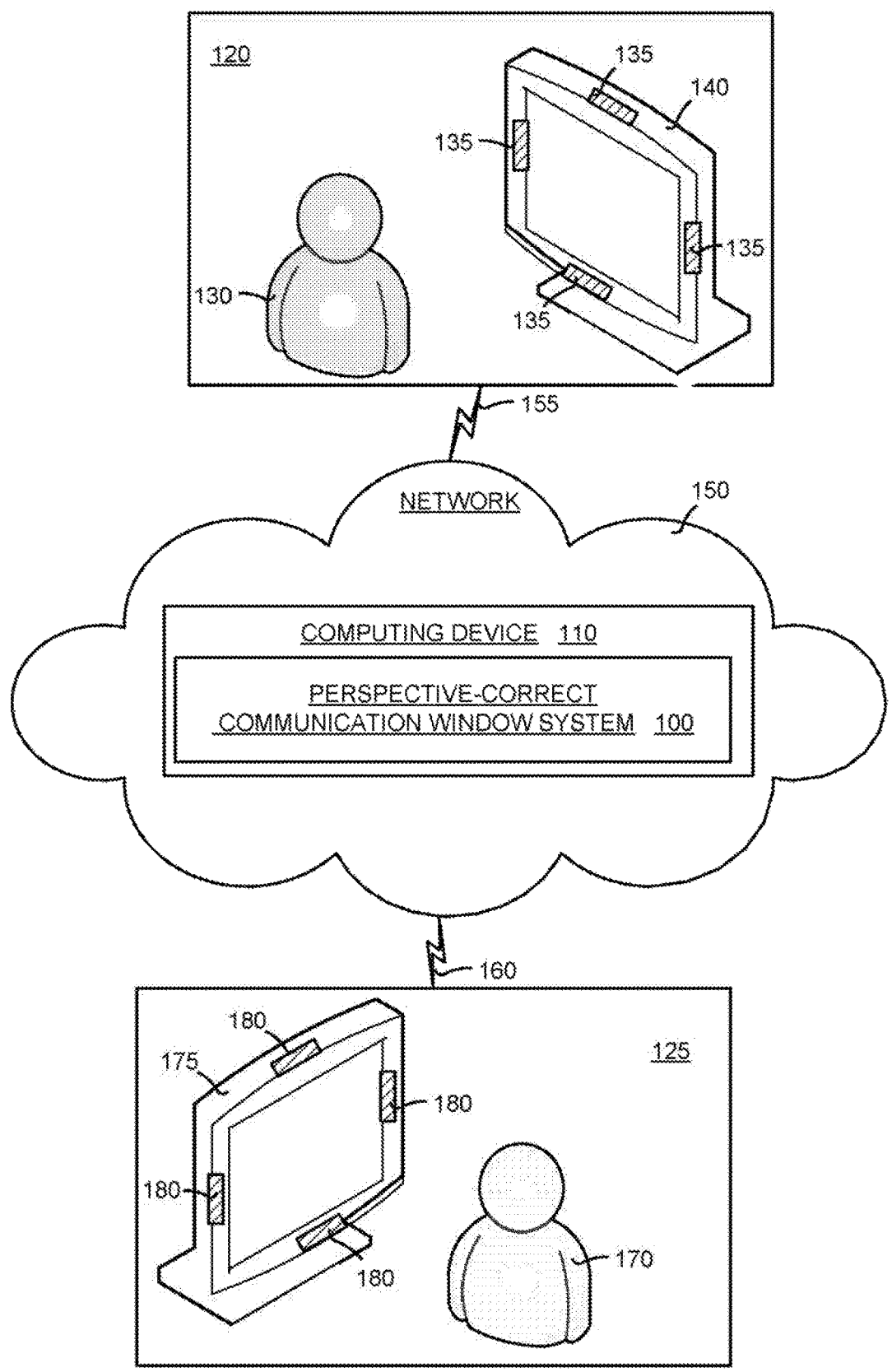
FIG. 1 is a block diagram illustrating a general overview of embodiments of the perspective-correct communication window system and method implemented in a computing environment.

Embodiments of the perspective-correct communication window system and method provide a way provide an "in person" communications experience for users. FIG. 1 is a block diagram illustrating a general overview of embodiments of the perspective-correct communication window system 100 and method implemented in a computing environment. In particular, embodiments of the system 100 and method are implemented on a computing device 110. This computing device may be a single computing device or may be spread out over a plurality of devices. Moreover, the computing device 110 may be virtually any device having a processor, including a desktop computer, a tablet computing device, and an embedded computing device.

As shown in FIG. 1, the computing environment includes a first environment 120 and a second environment 125. In the first environment 120, a first participant 130 is captured by a plurality of first camera pods 135. It should be noted that four camera pods are shown in FIG. 1, but fewer or more camera pods can be used. Also as shown in FIG. 1, the first plurality of camera pods 135 are shown attached to a first monitor 140, which is in communication with the computing device 110. However, it should be noted that in alternate embodiments the first plurality of camera pods 135 may be mounted on some other structure or there may be some mounted on the first monitor 140 and others mounted on other structures.

The first participant 130 is captured by the first plurality of camera pods 135 and processed by embodiments of the perspective-correct communication window system 100 and method, as explained in detail below. This processed information is transmitted across a network 150 using a first communication link 155 (from the first environment 120 to the network 150) and a second communication link 160 (from the network 150 to the second environment 125. In FIG. 1 embodiments of the system 100 and method are shown residing on the network 150. However, it should be noted that this is only one way in which the system 100 and method may be implemented.

The transmitted processed information is received in the second environment 125, processed by embodiments of the system 100 and method, and then displayed to a second participant 170 on a second monitor 175. As shown in FIG. 1, the second monitor 175 contains a second plurality of camera pods 180 that are used to capture the second participant 170. In addition, the second plurality of camera pods 180 are used to track the eye gaze of the second participant 170 and determine how the processed information should be presented to the second participant 170. This is explained in more detail below. Moreover, the first plurality of camera pods 135 is also are used to track the eye gaze of the first participant 130 and determine how processed information should be presented to the first participant 130. In alternate embodiments eye gaze is tracked using some other device that a camera pod, such as an external camera.

It should be noted that embodiments of the system 100 and method work in both directions. In other words, the first environment 120 can also receive transmissions from the second environment 125 and the second environment 125 can also transmit processed information. For pedagogical purposes, however, only the transmission from the first environment 120 to the system 120 and method and on to the second environment 125 is discussed above.

II. System Details

Embodiments of the system 100 and method include three main components that work together to create that "in person" communications experience. The first component is capturing and creating a three-dimensional (3D) video image of each person participating in the conference. The second component is creating the relevant scene geometry based on the number of participants in the conference. This component ensures that the resultant geometry between virtual viewpoints (or windows) at the endpoints is the same. And the third component is rendering and providing a virtual view as if the camera was positioned from the perspective of where the viewer is looking, thereby recreating the same scene geometry participants would have when talking in person.

Figure 2:
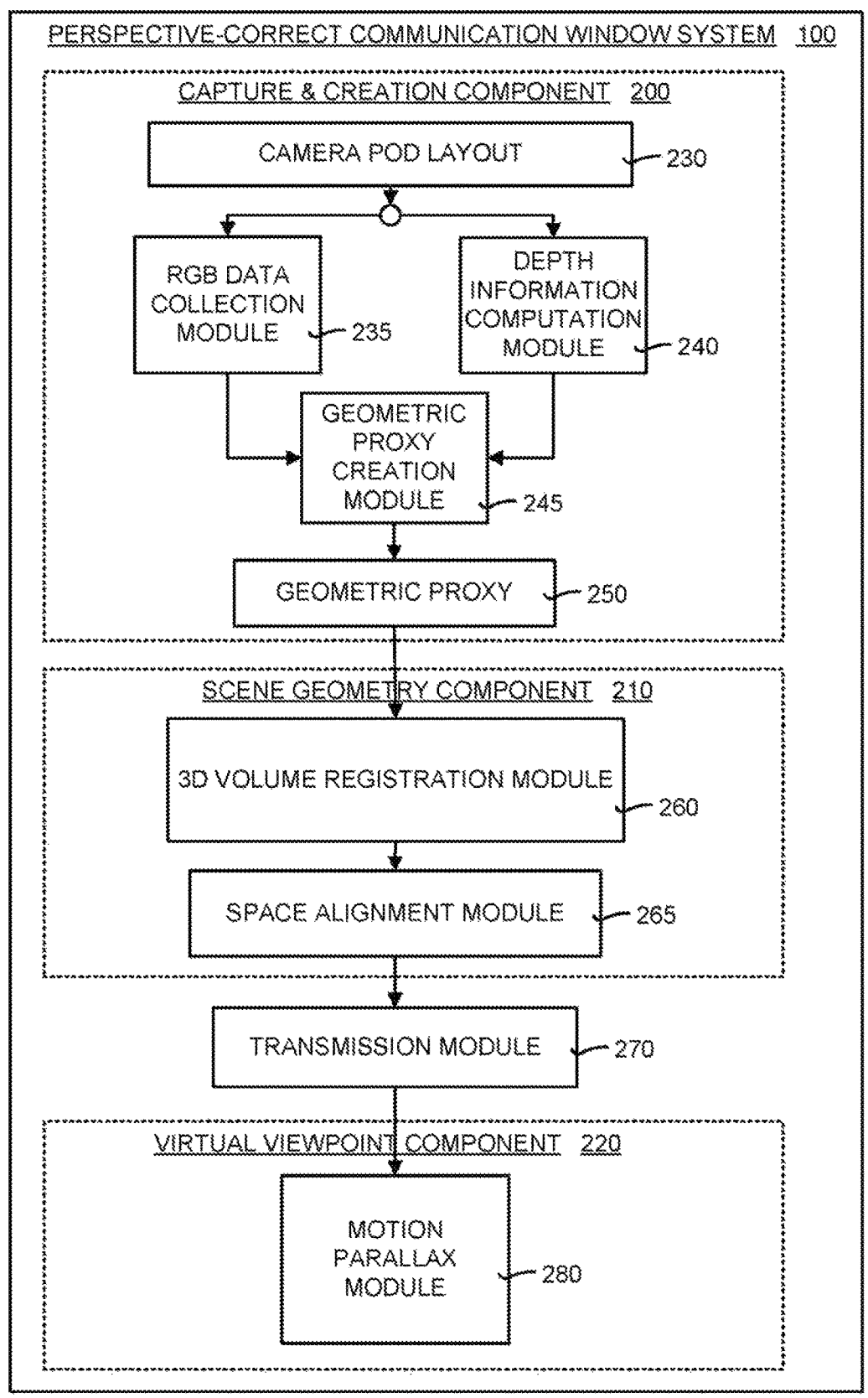
FIG. 2 is a block diagram illustrating the system details of embodiments of the perspective-correct communication window system and method shown in FIG. 1.

FIG. 2 is a block diagram illustrating the system details of embodiments of the perspective-correct communication window system 100 and method shown in FIG. 1. As shown in FIG. 2, embodiments of the system 100 and method include a capture and creation component 200, a scene geometry component 210, and a virtual viewpoint component 220. The capture and creation component is used for capturing and creating a 3D video image of the participant.

Specifically, the capture and creation component 200 includes a camera pod layout 230 that includes a plurality of camera pods. The camera pod layout 230 is used to capture a participant from multiple perspectives. Computer vision methods are used to create a high-fidelity geometry proxy for each meeting participant. As explained in detail below, this is achieved by taking RBG data obtained from an RGB data collection module 235 and depth information obtained and computed by a depth information computation module 240. From this information a geometric proxy creation module 245 creates a geometric proxy 250 for each participant. Image-based rendering methods are used to create photorealistic textures for the geometric proxy 250 such as with view-dependent texture mapping.

The scene geometry component 210 is used to create the correct scene geometry to simulate participants being together in a real conversation. This scene geometry is dependent on the number of participants (or endpoints) in the conference. A 3D registration module 260 is used to obtain a precise registration of a monitor with the camera pods. Moreover, a space alignment module 265 aligns the orientation of the camera pods with the real world. For a 1:1 meeting (having two participants), this is simply the two physical spaces lined up across from one another in the virtual environment. The capture area that is being recreated for each participant is the area in front of the monitor.

Once the textured geometric proxy 250 has been created for each meeting participant and the participants are represented in a 3D virtual space that is related to the other participants in the conference, the geometric proxies are rendered to each other in a manner consistent with conversational geometry. Moreover, this rendering is done based on the number of participants in the conference. Virtual boxes are used to ensure that an eye gaze and conversational geometry between the participants is correct and that to other participants the conversational geometry looks correct so that the viewer can correctly see the other participants.

The geometric proxies and in some cases the registration and alignment information are transmitted to remote participants by the transmission module 270. The virtual viewpoint component 220 is used to enhance the virtual view rendered to the remote participants. The experience of 'being there' is enhanced through the use of a motion parallax module 280 that adds motion parallax and depth to the scene behind the participants. Horizontal and lateral movements by either participant change the viewpoint shown on their local displays and the participant sees the scene they are viewing, and the person in it, from a different perspective. This greatly enhances the experience of the meeting participants.

III. Exemplary Operating Environment

Before proceeding further with the operational overview and details of embodiments of the perspective-correct communication window system and method, a discussion will now be presented of an exemplary operating environment in which embodiments of the perspective-correct communication window system 100 and method may operate. Embodiments of the perspective-correct communication window system 100 and method described herein are operational within numerous types of general purpose or special purpose computing system environments or configurations.

Figure 3:
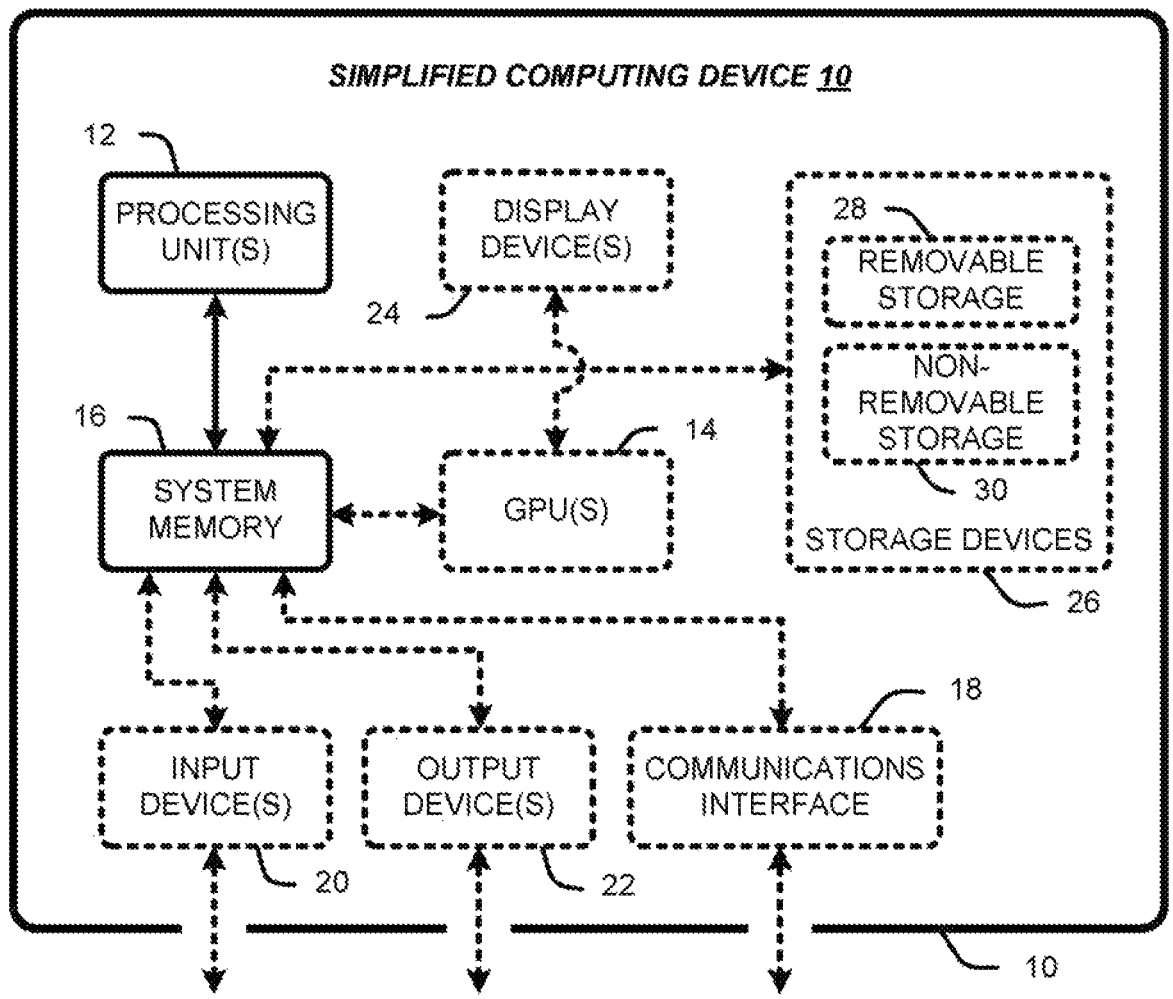
FIG. 3 illustrates a simplified example of a general-purpose computer system on which various embodiments and elements of the perspective-correct communication window system and method, as described herein and shown in FIGS. 1, 2, and 4-8, may be implemented.

FIG. 3 illustrates a simplified example of a general-purpose computer system on which various embodiments and elements of the perspective-correct communication window system 100 and method, as described herein and shown in FIGS. 1, 2, and 4-12, may be implemented. It should be noted that any boxes that are represented by broken or dashed lines in FIG. 3 represent alternate embodiments of the simplified computing device, and that any or all of these alternate embodiments, as described below, may be used in combination with other alternate embodiments that are described throughout this document.

For example, FIG. 3 shows a general system diagram showing a simplified computing device 10. The simplified computing device 10 may be a simplified version of the computing device 110 shown in FIG. 1. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement embodiments of the perspective-correct communication window system 100 and method described herein, the device should have a sufficient computational capability and system memory to enable basic computational operations. In particular, as illustrated by FIG. 3, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device 10 of FIG. 3 may also include other components, such as, for example, a communications interface 18. The simplified computing device 10 of FIG. 3 may also include one or more conventional computer input devices 20 (such as styli, pointing devices, keyboards, audio input devices, video input devices, haptic input devices, devices for receiving wired or wireless data transmissions, etc.). The simplified computing device 10 of FIG. 3 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device 10 of FIG. 3 may also include a variety of computer readable media. Computer readable media can be any available media that can be accessed by the simplified computing device 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the perspective-correct communication window system 100 and method described herein, or portions thereof, may be stored, received, transmitted, or read from any desired combination of computer or machine readable media or storage devices and communication media in the form of computer executable instructions or other data structures.

Finally, embodiments of the perspective-correct communication window 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks.

In a distributed computing environment, program modules may be located in both local and remote computer storage media including media storage devices. Still further, the aforementioned instructions may be implemented, in part or in whole, as hardware logic circuits, which may or may not include a processor.

IV. Operational Overview

Figure 4:
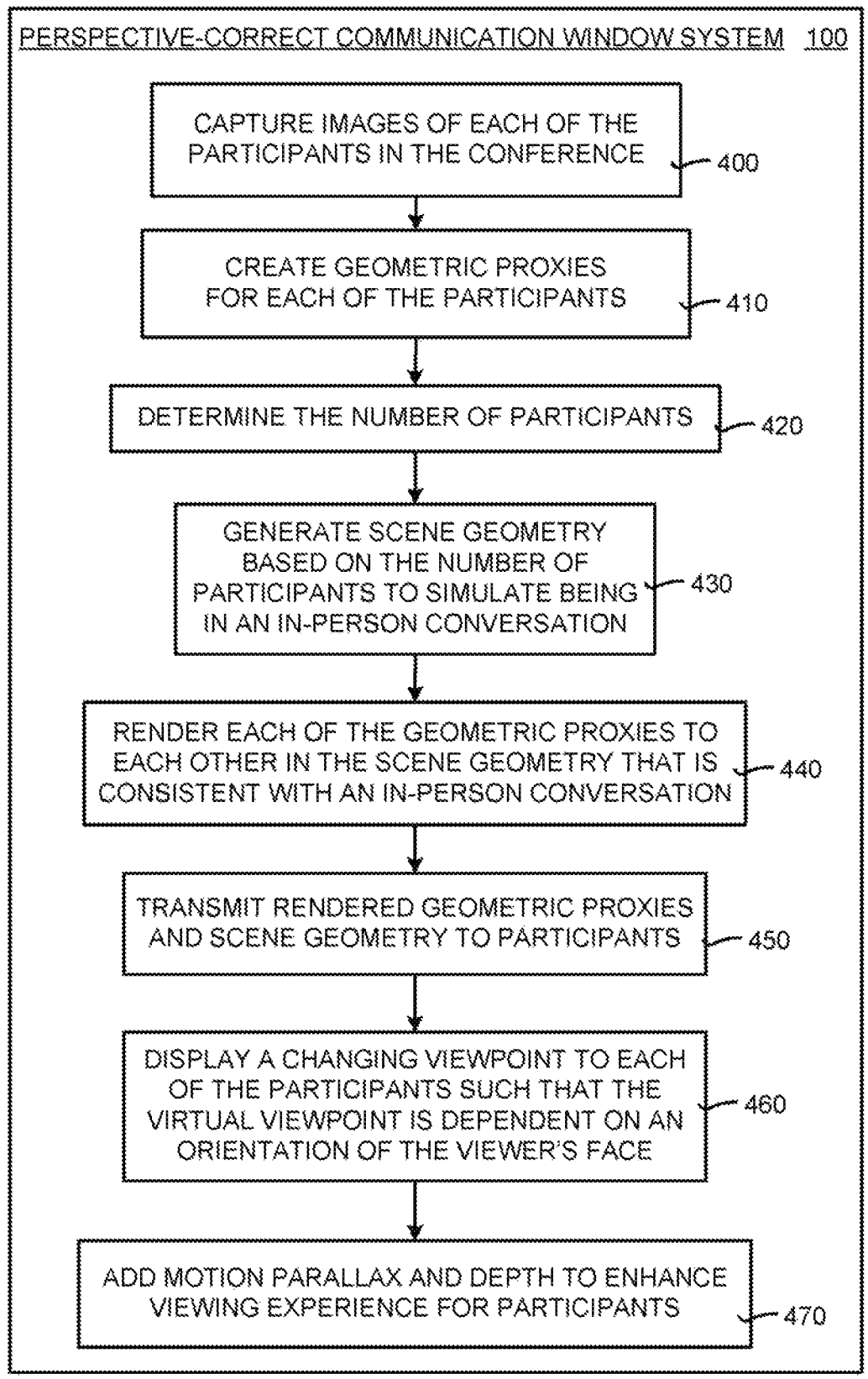
FIG. 4 is a flow diagram illustrating the general operation of embodiments of the perspective-correct communication window system and method shown in FIGS. 1 and 2.

FIG. 4 is a flow diagram illustrating the general operation of embodiments of the perspective-correct communication window system 100 and method shown in FIGS. 1 and 2. As shown in FIG. 3, the operation of embodiments of the perspective-correct communication window system 100 and method begins by capturing images of each of the participants in the conference or meeting (box 400). At least one of the participants is a remote participant, which means that the remote participant is not in the same physical location as the other participant. The capture of each participant is achieved by using the camera pods.

Next, embodiments of the method use data from the captured images to create a geometric proxy for each participant (box 410). The number of participants then is determined (box 420). This determination may be performed out of order such that the number of participants is determined or known beforehand. Embodiments of the method then generate scene geometry based on the number of participants (box 430). This scene geometry generation helps to simulate the experience of an in-person conversation or meeting with the remote participants.

Each geometric proxy for a particular participant then is rendered to the other geometric proxies for the other participants within the scene geometry (box 440). This rendering is performed such that the geometric proxies are arranged in a manner that is consistent with an in-person conversation. These rendered geometric proxies and the scene geometry then are transmitted to the participants (box 450). A changing virtual viewpoint is displayed to each of the participants such that the virtual viewpoint is dependent on an orientation of the viewer's face (box 460). For additional realism, motion parallax and depth are added in order to enhance the viewing experience for the participants (box 470). As explained in detail below, the motion parallax and depth are dependent on the eye gaze of the participant relative to the monitor on which the participant in viewing the conference or meeting.

V. Operational Details

The operational details of embodiments of the perspective-correct communication window system 100 and method will now be discussed. This includes the details of the camera pods, camera pod layout, the geometric proxy creation, and the creation of the scene geometry. Moreover, also discussed will be the concept of a virtual camera, the addition of motion parallax and depth to the geometric proxies and scene geometry, and the handling of more than one participant in the same environment and viewing the same monitor.

V.A. Camera Pod

The first component of embodiments of the perspective-correct communication window system 100 and method is the capture and creation component 200. This component includes a plurality of camera pods that are used to capture the 3D scene. Moreover, as explained below, each camera pod contains multiple sensors.

Figure 5:
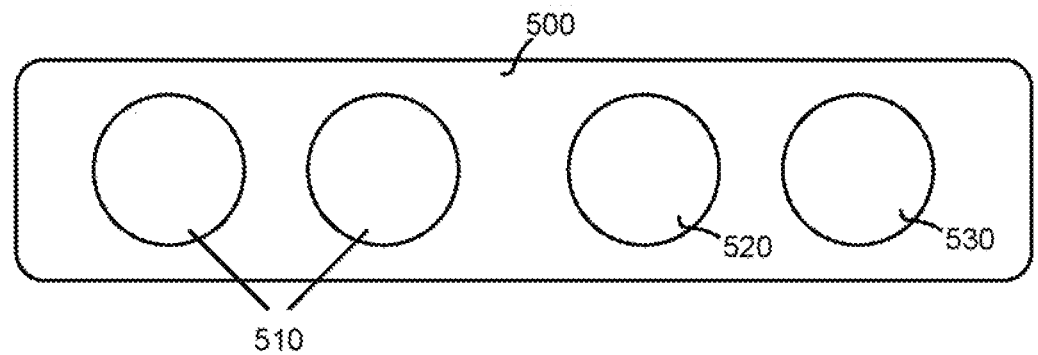
FIG. 5 is a block diagram illustrating the details of an exemplary embodiment of a camera pod of embodiments of the perspective-correct communication window system and method shown in FIG. 1.

FIG. 5 is a block diagram illustrating the details of an exemplary embodiment of a camera pod 500 of embodiments of the perspective-correct communication window system 100 and method shown in FIG. 1. As noted above, embodiments of the system 100 and method typically include more than one camera pod 500. However, for pedagogical purposes only a single camera pod will be described. Moreover, it should be noted that the multiple camera pods do not necessarily have to include the same sensors. Some embodiments of the system 100 and method may include a plurality of camera pods that contain different sensors from each other.

As shown in FIG. 5, the camera pod 500 includes multiple camera sensors. These sensors include stereoscopic sensors infrared (IR) cameras 510, an RGB camera 520, and an IR emitter 530. In order to capture a 3D image of the scene the camera pod 500 captures RGB data and the depth coordinates in order to compute a depth map. FIG. 5 illustrates that the IR stereoscopic IR cameras 510 and the IR emitter 530 are used to capture the depth calculation. The RGB camera 520 is used for the texture acquisition and to reinforce the depth cues using depth segmentation. Depth segmentation, which is well known in the computer vision field, seeks to separate objects in an image from the background using background subtraction.

In alternative embodiments, the camera pod 500 achieves stereoscopic sensing using time of flight sensors or ultrasound instead of the IR structure light approach. A time-of-flight camera is a range imaging camera system that computes distance based on the speed of light and by measuring the time of flight of a light signal between the camera and the object for each point in an image. Ultrasound techniques can be used compute distance by generating an ultrasonic pulse in a certain direction. If there is an object in the path of the pulse, then part or all of the pulse will be reflected back to the transmitter as an echo. The range can be found by measuring the difference between the pulse being transmitted and the echo being received. In other embodiments the distance may be found be performing an RGB depth calculation using stereo pairs of RGB camera.

V.B. Camera Pod Layout

Also part of the capture and creation component 200 is the camera pod layout. One or more camera pods are configured in a particular layout in order to capture the 3D scene that includes one or more of the participants. The number of camera pods directly affects the quality of the captured images and the number of occlusions. As the number of camera pods increases there is more RGB data available and this improves image quality. Moreover, the number of occlusions is diminished as the number of camera pods increases.

In some embodiments of the system 100 and method the camera pod layout uses four camera pods. In alternate embodiments any number of cameras may be used. In fact there could be a lower-end version that uses a single camera pod. For example, the single camera pod may be mounted on top of a monitor and use image distortion correction techniques to correct for any imaging errors. The touchstone is that the camera pod layout should have enough camera pods to provide a 3D view of the environment containing the participant.

Figure 6:
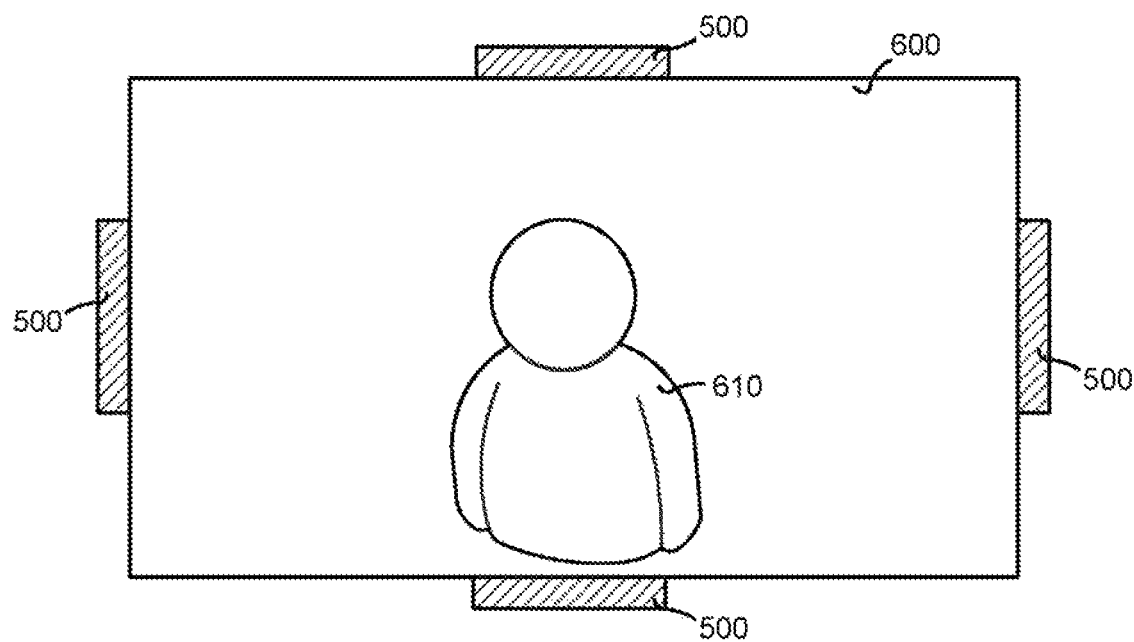
FIG. 6 illustrates an exemplary embodiment of a camera pod layout (such as that shown in FIG. 2) using four camera pods.

FIG. 6 illustrates an exemplary embodiment of a camera pod layout (such as that shown in FIG. 2) using four camera pods. As shown in FIG. 6, the four camera pods 500 are embedded in the bezel of a monitor 600. The monitor 600 can be of virtually any size, but larger monitors provide a more life-size re-projection. This typically provides the user with the more realistic experience. Displayed on the monitor 600 is a remote participant 610 that is participating in the conference or meeting.

As shown in FIG. 6, the four camera pods 500 are arranged in a diamond configuration. This allows embodiments of the system 100 and method to capture the user from above and below and from side to side. Moreover, the two middle top and bottom camera pods can be used to get a realistic texture on the face of the user without a seam. Note that cameras in the corners will typically causes a seam issue. In other embodiments virtually any configuration and arrangement of the four camera pods 500 can be used and may be mounted anywhere on the monitor 600. In still other embodiments one or more of the four camera pods 500 are mounted in places other than the monitor 600.

In alternate embodiments three camera pods are used and positioned at the top or bottom of the monitor 600. Some embodiments use two camera pods that are positioned at the top or bottom corners of the monitor 600. In still other embodiments N camera pods are used, where N is greater than four (N>4). In this embodiment the N camera pods are positioned around the outside edge of the monitor 600. In yet other embodiments there are multiple camera pods positioned behind the monitor 600 in order to capture the 3D scene of the environment containing the local participant.

V.C. Geometric Proxy Creation

Another part of the capture and creation component 200 is the geometric proxy creation module 245. It should be noted that the geometric proxy is not an avatar or a graphical representation of the user. Instead, the geometric proxy is a geometric representation of the participant that has real video painted onto the geometric representation frame by frame in order to increase the realism. The module 245 creates a geometric proxy for each of the participants in the conference or meeting. Depth information is computed from range data captured by the camera pods 500. Once the depth information is obtained a sparse point cloud is created from depth points contained in the captured depth information. A dense depth point cloud then is generated using known methods and the captured depth information. In some embodiments a mesh is constructed from the dense point cloud and the geometric proxy is generated from the mesh. In alternate embodiments the dense point clouds are textured in order to generate the geometric proxy.

Figure 7:
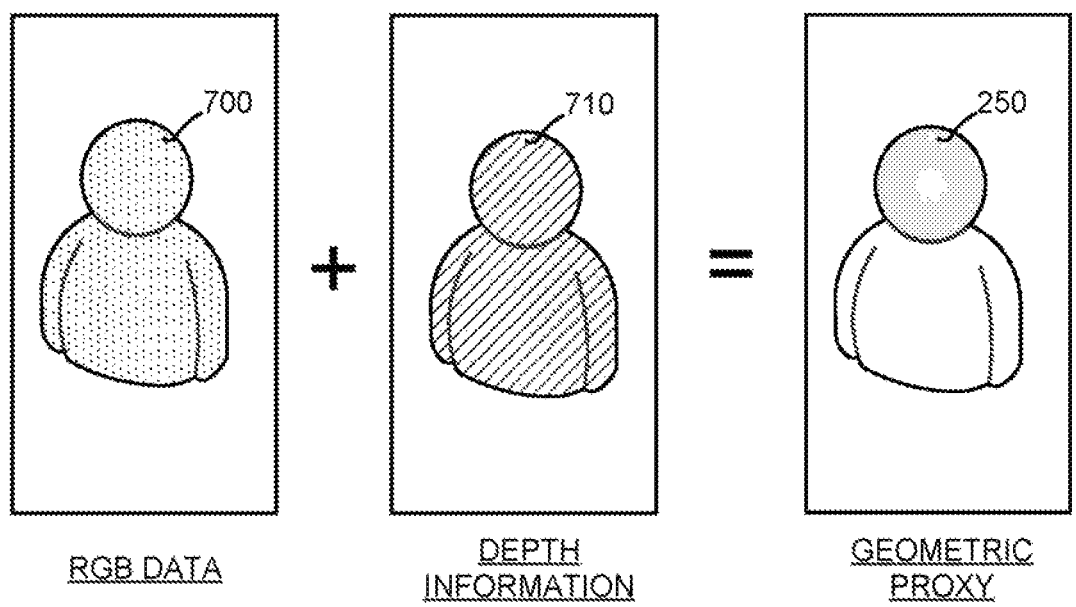
FIG. 7 illustrates an exemplary overview of the creation of a geometric proxy for a single meeting participant.

FIG. 7 illustrates an exemplary overview of the creation of a geometric proxy for a single meeting participant. As shown in FIG. 7, RGB data 700 is captured from the RGB cameras of the camera pods 500. In addition, depth information 710 is computed from the depth data obtained by the camera pods 500. The RGB data 700 and the depth information 710 are added together in order to create the geometric proxy 250 for the single meeting participant. This geometric proxy creation is performed for each of the participants such that each participant has a corresponding geometric proxy.

V.D. Registration of the 3D Volume and Alignment of the 3D Space

The second component of embodiments of the perspective-correct communication window system 100 and method is the scene geometry component 210. This includes both the registration of the 3D volume and the alignment of the 3D space that the camera pods 500 capture. The general idea of the scene geometry component 210 is to create relative geometry between the meeting participants. The desire is to align the scene exactly as if the participants are in the same physical location and engaged in an in-person conversation.

Embodiments of the system 100 and method create the scene geometry that is a 3D scene anchored at the capturing environment. In order to achieve this it is desirable to have a precise estimation of the environments containing each of the participants. Once this is obtained then embodiments of the system 100 and method compute a precise registration of the monitor with the cameras. This yields an orientation in virtual space that is aligned with the real world. In other words, the virtual space is aligned with the real space. This registration and alignment is achieved using known methods. In some embodiments of the system 100 and method the calibration is performed at the time of manufacture. In other embodiments calibration is performed using a reference object in the environment.

The scene geometry seeks to create relative geometry between a local participant and remote participants. This includes creating eye gaze and conversional geometry as if the participants were in an in-person meeting. One way in which to get eye gaze and conversational geometry correct is to have relative, consistent geometry between the participants. In some embodiments this is achieved by using virtual boxes. Specifically, if a box was drawn around the participants in real space when the participants are in a room together, then these virtual boxes are recreated in a virtual layout to create the scene geometry. The shape of the geometry does not matter as much as its consistency between the participants.

Certain input form factors like single monitor or multiple monitors will affect the optimum layout and scalability of the solution. The scene geometry also depends on the number of participants. A meeting with two participants (a local participant and a remote participant) is a one-to-one (1:1) scene geometry that is different from the scene geometry when there are three or more participants. Moreover, as will be seen from the examples below, the scene geometry includes eye gaze between the participants.

Figure 8:
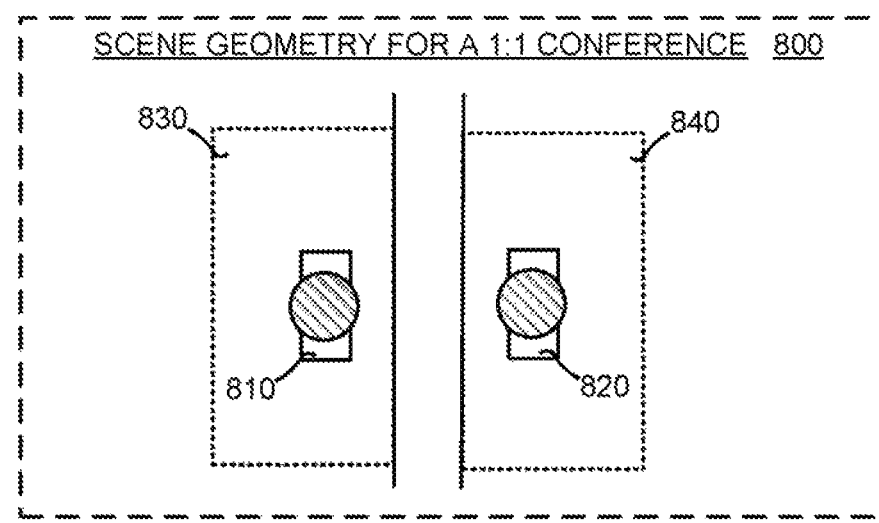
FIG. 8 illustrates an exemplary embodiment of the scene geometry between participants when there are two participants in the meeting (a 1:1 conference).

FIG. 8 illustrates an exemplary embodiment of scene geometry between participants when there are two participants in the meeting. As shown in FIG. 8 this scene geometry for a 1:1 conference 800 includes a first participant 810 and a second participant 820. These participants are not in the same physical location.

In this scene geometry for a 1:1 conference 800, the geometry consists of two boxes that occupy the spaces in front of the respective monitors (not shown) of the participants 810, 820. A first virtual box 830 is drawn around the first participant 810 and a second virtual box 840 is drawn around the second participant 820. Assuming the same size monitors and consistent setups allows embodiments of the system 100 and method to know the scene geometry is correct without any manipulation of the captured data.

Figure 9:
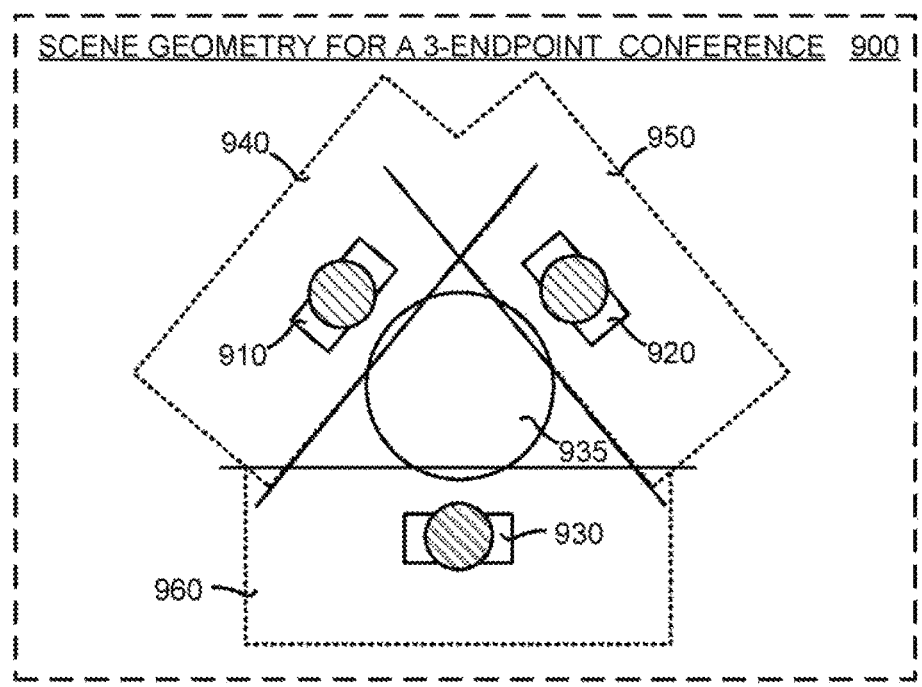
FIG. 9 illustrates an exemplary embodiment of the scene geometry between participants when there are three participants in the meeting (a 3-endpoint conference).

In alternate embodiments of the system 100 and method there are multiple remote participants and the geometry is different from the scene geometry for a 1:1 conference 800. FIG. 9 illustrates an exemplary embodiment of the scene geometry between participants when there are three participants in the meeting. This is the scene geometry for a 3-endpoint conference 900. An endpoint is an environment containing a participant of the conference or meeting. In a 3-endpoint conference there are participants in three different physical locations.

In FIG. 9 the scene geometry for a 3-endpoint conference 900 includes participant #1 910, participant #2 920, and participant #3 930 around a virtual round table 935. A virtual box #1 940 is drawn around participant #1 910, a virtual box #2 950 is drawn around participant #2 920, and a virtual box #3 960 is drawn around participant #3 930. Each of the virtual boxes 940, 950, 960 is placed around the virtual round table 935 in an equidistant manner. This creates the scene geometry for a 3-endpoint conference 900.

This scene geometry can be extended for additional endpoints. However, at a certain point, such as when there are 4 to 5 endpoints (depending on size of screen) with a flat screen, the scene geometry exceeds the ability of the capture and render of natural pose positions. In that case, in order to preserve conversational geometry while not having consistent virtual and physical geometry, embodiments of the system 100 and method seek to "pose" participants as they look at one another, exaggerating their movements for people in the call in order to show them at who they are looking. This, however, can get quite complicated and can lead to an uncanny valley type of experience.

V.E. Virtual Camera

The scene geometry component 210 also includes a virtual camera. The virtual camera defines the perspective projection according to which a novel view of the 3D geometric proxy will be rendered. This allows embodiments of the system 100 and method to obtain a natural eye gaze and connection between people. One breakdown in current video conferencing occurs because people are not looking where a camera is positioned, so that the remote participants in the conference feel as though the other person is not looking at them. This is unnatural and typically does not occur in an in-person conversion.

The virtual camera in embodiments of the system 100 and method is created using the virtual space from the scene geometry and the 3D geometric proxy (having detailed texture information) for each participant. This virtual camera is not bound to the locations of the real camera pods being used to capture the images. Moreover, some embodiments of the system 100 and method use face tracking (including eye gaze tracking) to determine where the participants are and where they are looking in their virtual space. This allows a virtual camera to be created based on where a participant is looking in the scene. This serves to accurately convey the proper gaze of the participant to other participants and provides them the proper view. Thus, the virtual camera facilitates natural eye gaze and conversational geometry in the interaction between meeting participants.

Creating a scene geometry and putting extras in that geometry create these virtual cameras. From the multiple perspectives obtained by the camera pods the virtual camera is able to move around the scene geometry and see interpolated views where no real camera exists. For example think of the head as a balloon. The front of the balloon will be captured by a camera pod in front of the balloon and one side of the balloon will be captured by a camera pod on that side of the balloon. A virtual camera can be created anywhere in between the full front and the side by a composition of images from both camera pods. In other words, the virtual camera view is created as a composition of images from the different cameras covering a particular space.

Figure 10:
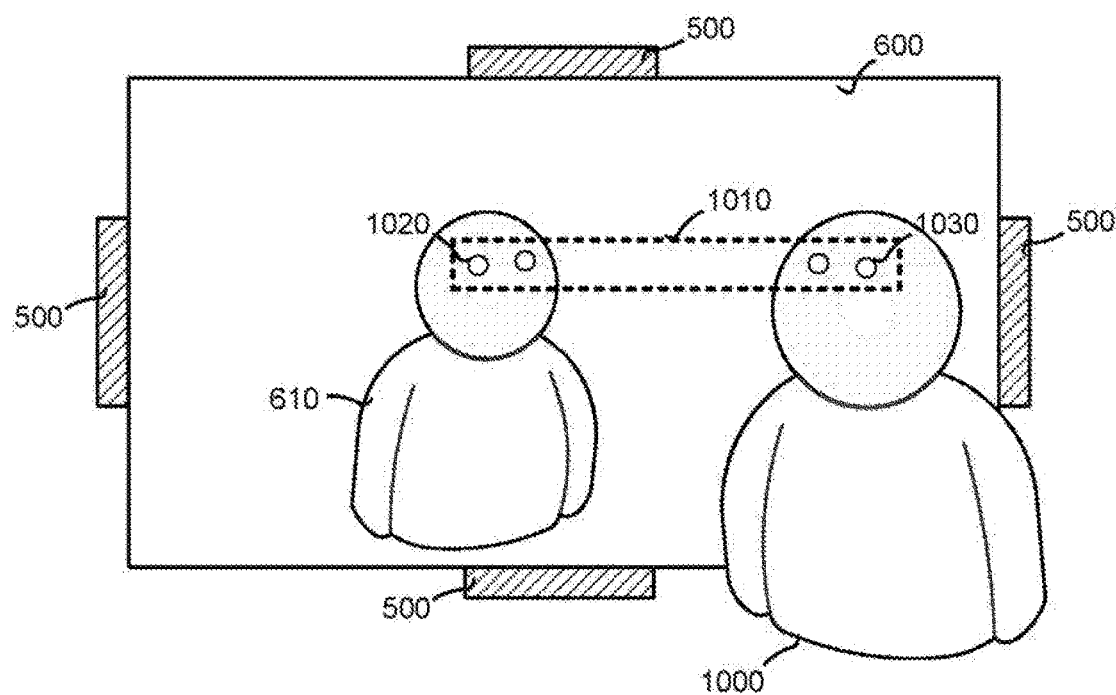
FIG. 10 illustrates an exemplary embodiment of a virtual camera based on where the participant is looking.

FIG. 10 illustrates an exemplary embodiment of a virtual camera based on where a participant is looking. This can also be thought of as using virtual gaze to obtain natural eye gaze. As shown in FIG. 10, the monitor 600 displays the remote participant 610 to a local participant 1000. The monitor 600 includes the four camera pods 500. A virtual eye gaze box 1010 is drawn around eyes of the remote participant 1020 and eyes of the local participant 1030. The virtual eye gaze box 1010 is level such that in virtual space the eyes of the remote participant 1020 and eyes of the local participant 1030 are looking at each other.

Some embodiments of the virtual camera use face tracking to improve performance. Face tracking helps embodiments of the system 100 and method change the perspective so that the participants are always facing each other. Face tracking helps the virtual camera remain level with the eye gaze of the viewer. This mimics how our eyes work during an in-person conversation. The virtual camera interacts with the face tracking to create a virtual viewpoint that has the user looking straight at the other participant. In other words, the face tracking is used to change the virtual viewpoint of the virtual camera.

V.F. Depth Through Motion Parallax

The third component of the system 100 and method is the virtual viewpoint component 220. Once the rendered geometric proxies and scene geometry are transmitted to the participants it is rendered on the monitors of the participants. In order to add realism to the scene displayed on the monitor, depth using motion parallax is added to provide the nuanced changes in view that come when the position of someone viewing something changes.

Figure 11:
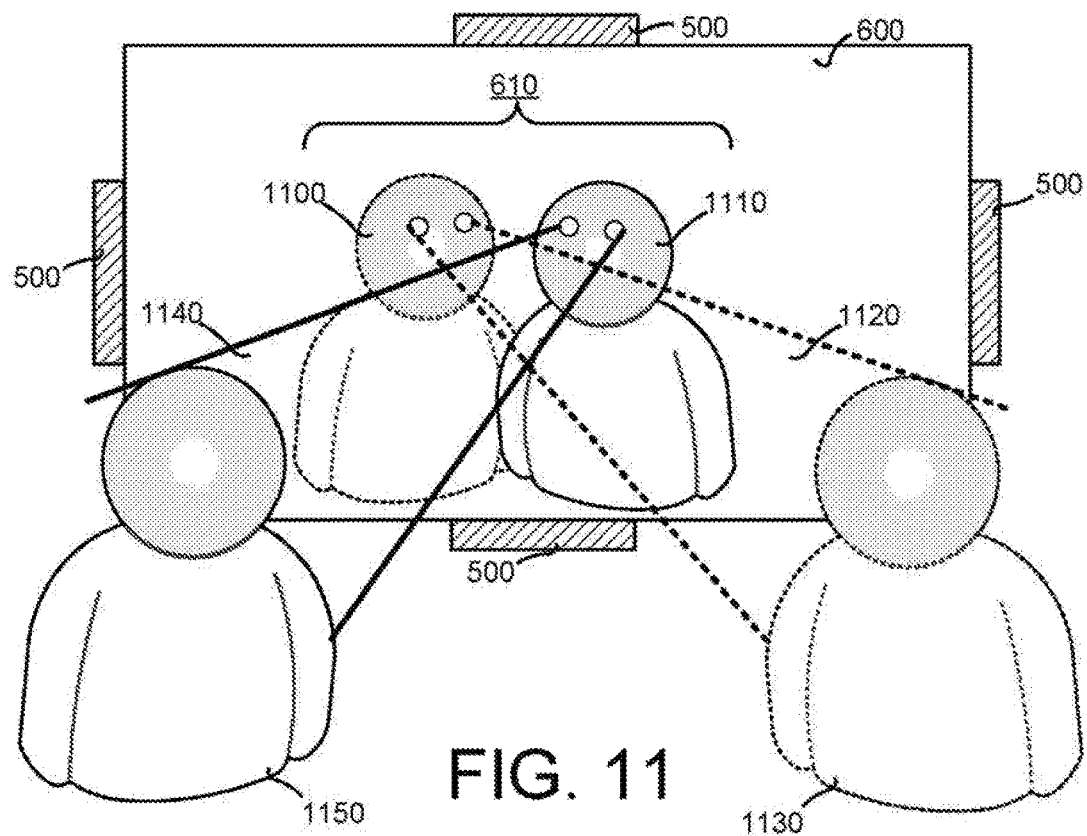
FIG. 11 illustrates an exemplary embodiment of providing depth through motion parallax based on where a viewer is facing.

Motion parallax is added using high-speed head tracking that shifts the camera view as the viewer's head moves. This creates the illusion of depth. FIG. 11 illustrates an exemplary embodiment of providing depth through motion parallax based on where a viewer is facing. As shown in FIG. 11, the monitor 600 having the four camera pods 500 displays an image of the remote participant 610. Note that in FIG. 11 the remote participant 610 is shown as a dotted-line FIG. 1100 and a solid-line FIG. 1110. The dotted-line FIG. 1110 illustrates that the remote participant 610 is looking to his left and thus has a first field-of-view 1120 that includes a dotted-line participant 1130. The solid-line FIG. 1110 illustrates that the remote participant 610 is looking to his right and thus has a second field-of-view 1140 that includes a solid-line participant 1150.

As the remote participant's 610 viewpoint moves side to side his perspective into the other space changes. This gives the remote participant 610 a different view of the other participants and the room (or environment) in which the other participants are located. Thus, if the remote participant moves left, right, up, or down he will see a slightly different view of the participant that the remote participant 610 is interacting with and the background behind that person shifts as well. This gives the scene a sense of depth and gives the people in the scene the sense of volume that they get when talking to someone in person. The remote participant's viewpoint is tracked using head tracking or a low-latency face tracking technique. Depth through motion parallax dramatically enhances the volume feel while providing full freedom of movement since the viewer is not locked to one camera perspective.

V.G. Multiple Participants at a Single Endpoint

Embodiments of the system 100 and method also include the situation where there is more than one participant at an endpoint. The above technique for depth through motion parallax works well for a single viewer because of the ability to track the viewer and to provide the appropriate view on the monitor based on their viewing angle and location. This does not work, however, if there is a second person at the same endpoint and viewing the same monitor because the monitor can only provide one scene at a time and it will be locked to one person. This causes the view to be off for the other viewer that is not being tracked.

There are several ways in which embodiments of the system 100 and method address this issue. In some embodiments monitors are used that provide different images to different viewers. In these embodiments the face tracking technique tracks two difference faces and then provides different views to different viewers. In other embodiments the motion parallax is removed and a fixed virtual camera is locked in the center of the monitor. This creates a substandard experience when more than one participant is at an endpoint. In still other embodiments glasses are worn by each of the multiple participants at the endpoint. Each pair of glasses is used to provide different views. In still other embodiments the glasses have active shutters on them that show each wearer different frames from the monitor. The alternating frames displayed by the monitor are tuned to each pair of glasses and provide each viewer the correct image based on the viewer's location.

Figure 12:
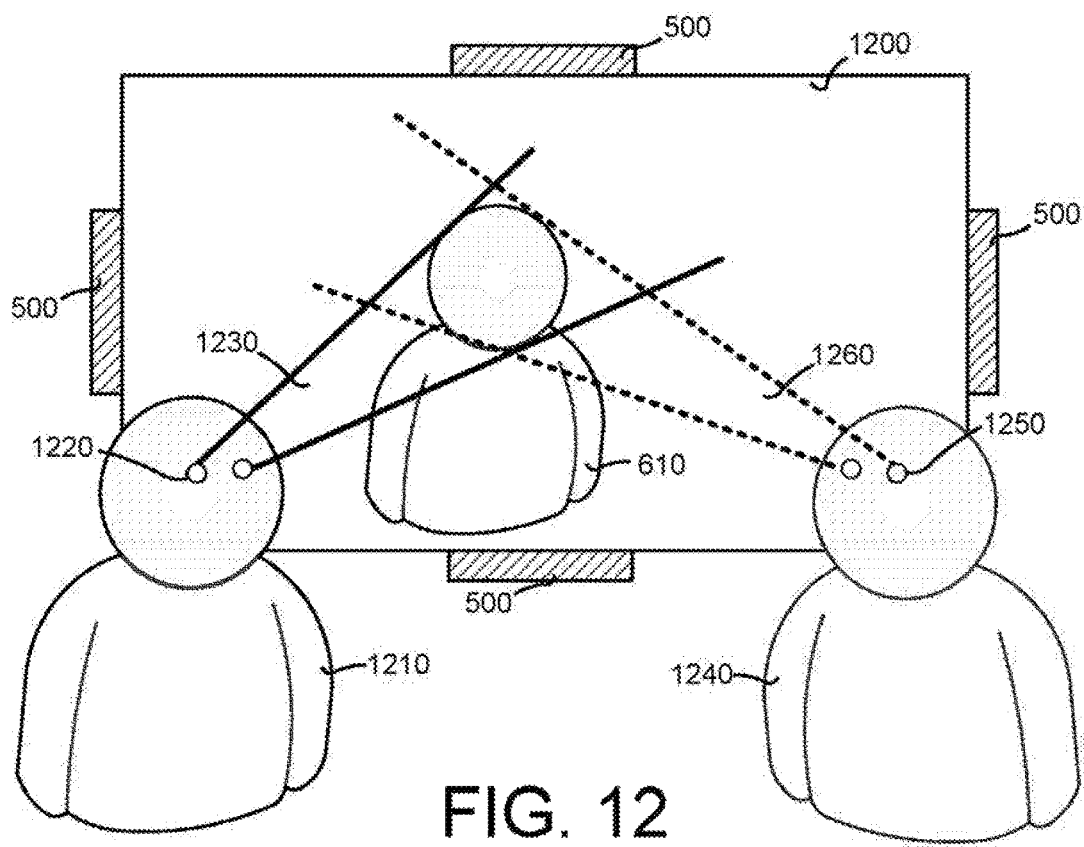
FIG. 12 illustrates an exemplary embodiment of a technique to handle multiple participants at a single endpoint.

Another embodiment uses a monitor having multiple viewing angles. FIG. 12 illustrates an exemplary embodiment of a technique to handle multiple participants at a single endpoint using the monitor having multiple viewing angles. This provides each viewer in front of the monitor with a different view of the remote participant 610 and the room behind the remote participant 610.

As shown in FIG. 12, a monitor having a lenticular display 1200 (which allows multiple viewing angles) and having the four camera pods 500 is displaying the remote participant 610. A first viewer 1210 is looking at the monitor 1200 from the left side of the monitor 1200. The eyes of the first viewer 1220 are looking at the monitor 1200 from the left side and have a left field-of-view 1230 of the monitor 1200. A second viewer 1240 is looking at the monitor 1200 from the right side of the monitor 1200. The eyes of the second viewer 1250 are looking at the monitor 1200 from the right side and have a right field-of-view 1260. Because of the lenticular display on the monitor 1200, the left field-of-view 1230 and the right field-of-view 1260 are different. In other words, the first viewer 1210 and the second viewer 1240 are provided with different view of the remote participant 610 and the room behind the remote participant 610. Thus, even if the first viewer 1210 and the second viewer 1240 were side by side, they would see different things on the monitor 1200 based on their viewpoint.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   one or more processors; and
   one or more computer-readable storage devices having computer-executable instructions stored thereon that, when executed by the one or more processors, configure the system to perform operations comprising:
      generating a plurality of geometric proxies for a plurality of participants in a communication session, wherein:
         each geometric proxy selected from the geometric proxies comprises a geometric representation of a participant selected from the plurality of participants; and
         each of the geometric proxies is generated from acquired depth information and is associated with a particular virtual box;
      generating a scene geometry that visually simulates an in-person meeting of the plurality of participants, wherein:
         the scene geometry includes the plurality of geometric proxies; and
         the virtual boxes of the geometric proxies are aligned within the scene geometry based on a number of the participants and a reference object to which the virtual boxes are aligned; and
      causing a display of the scene geometry with the plurality of geometric proxies, wherein the display of a particular geometric proxy comprises a video of the participant corresponding to the particular geometric painted onto the particular geometric proxy.

2. The system of claim 1, wherein the operations further comprise:
   acquiring depth information for the plurality of participants, wherein the depth information for a participant selected from the from plurality of participants is based on a distance between the selected participant and a camera;
   generating a plurality of sparse point clouds from the acquired depth information, wherein:
      a sparse point cloud selected from the plurality of sparse point clouds has a first number of points; and
      each sparse point cloud corresponds to a participant in the online communication; and
   generating a plurality of dense point clouds based on the sparse point clouds, wherein a dense point cloud selected from the plurality of dense point clouds has a second number of points greater than the first number of points; and
   wherein each geometric proxy is generated from a corresponding dense point cloud selected from the plurality of dense point clouds.

3. The system of claim 1, wherein causing a display of the scene geometry comprises causing a display of a virtual viewpoint that includes the plurality of geometric proxies, wherein a change in a detected position of a selected participant causes a change in the virtual viewpoint of a geometric proxy selected from the plurality of geometric proxies.

4. The system of claim 3, wherein the operations further comprise:
   adding a motion parallax to the virtual viewpoint using head tracking of a participant selected from the plurality of participants, wherein the motion parallax is dependent on an eye gaze of the selected participant.

5. The system of claim 1, wherein the virtual boxes are aligned to be virtually equidistant from the reference object.

6. The system of claim 1, wherein the operations further comprise:
   generating a first virtual eye gaze box around eyes of a first participant selected from the plurality of participants;
   generating a second virtual eye gaze box around eyes of a second participant selected from the plurality of participants; and
   aligning the first virtual eye gaze box and the second virtual eye gaze box such that first virtual eye gaze box is level with the second virtual eye gaze box.

7. The system of claim 1, wherein the system further comprises:
   a lenticular monitor that allows for multiple viewing angles; and wherein the operations further comprise:
   causing a display of the scene geometry by the lenticular display, wherein:
      a right field-of-view of the scene geometry is displayed on a right side of the lenticular display; and
      a left field-of-view of the scene geometry is displayed on a left side of the lenticular display.

8. A method comprising:
   generating, by one or more processors, a plurality of geometric proxies for a plurality of participants in a communication session, wherein:

each geometric proxy selected from the geometric proxies comprises a geometric representation of a participant selected from the plurality of participants; and each of the geometric proxies is generated from acquired depth information and is associated with a particular virtual box;

generating, by the one or more processors, a scene geometry that visually simulates an in-person meeting of the plurality of participants, wherein:

the scene geometry includes the plurality of geometric proxies; and the virtual boxes of the geometric proxies are aligned within the scene geometry based on a number of the participants and a reference object to which the virtual boxes are aligned; and causing, by the one or more processors, a display of the scene geometry with the plurality of geometric proxies, wherein the display of a particular geometric proxy comprises a video of the participant corresponding to the particular geometric painted onto the particular geometric proxy.

9. The method of claim 8, further comprising:

acquiring, by the one or more processors, depth information for the plurality of participants, wherein the depth information for a participant selected from the from plurality of participants is based on a distance between the selected participant and a camera;

generating, by the one or more processors, a plurality of sparse point clouds from the acquired depth information, wherein:

a sparse point cloud selected from the plurality of sparse point clouds has a first number of points; and each sparse point cloud corresponds to a participant in the online communication; and generating, by the one or more processors, a plurality of dense point clouds based on the sparse point clouds, wherein a dense point cloud selected from the plurality of dense point clouds has a second number of points greater than the first number of points; and wherein each geometric proxy is generated from a corresponding dense point cloud selected from the plurality of dense point clouds.

10. The method of claim 8, wherein causing a display of the scene geometry comprises causing a display of a virtual viewpoint that includes the plurality of geometric proxies, wherein a change in a detected position of a selected participant causes a change in the virtual viewpoint of a geometric proxy selected from the plurality of geometric proxies.

11. The method of claim 10, further comprising:

adding, by the one or more processors, a motion parallax to the virtual viewpoint using head tracking of a participant selected from the plurality of participants, wherein the motion parallax is dependent on an eye gaze of the selected participant.

12. The method of claim 8, wherein the virtual boxes are aligned to be virtually equidistant from the reference object.

13. The method of claim 8, further comprising:

generating, by the one or more processors, a first virtual eye gaze box around eyes of a first participant selected from the plurality of participants;

generating, by the one or more processors, a second virtual eye gaze box around eyes of a second participant selected from the plurality of participants; and aligning, by the one or more processors, the first virtual eye gaze box and the second virtual eye gaze box such that first virtual eye gaze box is level with the second virtual eye gaze box.

14. The method of claim 8, further comprising:

causing, by the one or more processors, a display of the scene geometry by a lenticular display that allows for multiple viewing angles, wherein:

a right field-of-view of the scene geometry is displayed on a right side of the lenticular display; and a left field-of-view of the scene geometry is displayed on a left side of the lenticular display.

15. A system comprising:

one or more processors; and one or more computer-readable storage devices having computer-executable instructions stored thereon that, when executed by the one or more processors, configure the system to establish:

means for generating a plurality of geometric proxies for a plurality of participants in a communication session, wherein:

each geometric proxy selected from the geometric proxies comprises a geometric representation of a participant selected from the plurality of participants; and each of the geometric proxies is generated from acquired depth information and is associated with a particular virtual box;

means for generating a scene geometry that visually simulates an in-person meeting of the plurality of participants, wherein:

the scene geometry includes the plurality of geometric proxies; and the virtual boxes of the geometric proxies are aligned within the scene geometry based on a number of the participants and a reference object to which the virtual boxes are aligned; and means for causing a display of the scene geometry with the plurality of geometric proxies, wherein the display of a particular geometric proxy comprises a video of the participant corresponding to the particular geometric painted onto the particular geometric proxy.

16. The system of claim 15, wherein the system further establishes:

means for acquiring depth information for the plurality of participants, wherein the depth information for a participant selected from the from plurality of participants is based on a distance between the selected participant and a camera;

means for generating a plurality of sparse point clouds from the acquired depth information, wherein:

a sparse point cloud selected from the plurality of sparse point clouds has a first number of points; and each sparse point cloud corresponds to a participant in the online communication; and means for generating a plurality of dense point clouds based on the sparse point clouds, wherein a dense point cloud selected from the plurality of dense point clouds has a second number of points greater than the first number of points; and wherein each geometric proxy is generated from a corresponding dense point cloud selected from the plurality of dense point clouds.

17. The system of claim 15, wherein the means for causing a display of the scene geometry comprises means for causing a display of a virtual viewpoint that includes the plurality of geometric proxies, wherein a change in a detected position of a selected participant causes a change in the virtual viewpoint of a geometric proxy selected from the plurality of geometric proxies.

18. The system of claim 17, wherein the system further establishes:
   means for adding a motion parallax to the virtual viewpoint using head tracking of a participant selected from the plurality of participants, wherein the motion parallax is dependent on an eye gaze of the selected participant.

19. The system of claim 15, wherein the virtual boxes are aligned to be virtually equidistant from the reference object.

20. The system of claim 15, wherein the system further establishes:
   means for generating a first virtual eye gaze box around eyes of a first participant selected from the plurality of participants;
   means for generating a second virtual eye gaze box around eyes of a second participant selected from the plurality of participants; and
   means for aligning the first virtual eye gaze box and the second virtual eye gaze box such that first virtual eye gaze box is level with the second virtual eye gaze box.

* * * * *